(12) United States Patent
Kim (10) Patent No.: US 6,216,189 B1
(45) Date of Patent: Apr. 10, 2001

(54) ERROR MASTER DETECTOR

(75) Inventor: Sun-gi Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/045,588

(22) Filed: Mar. 20, 1998

(30) Foreign Application Priority Data

Mar. 20, 1997 (KR) .................................................. 97-9538

(51) Int. Cl.[7] .............................. G06F 13/362; H04L 1/22
(52) U.S. Cl. .............................................. 710/113; 714/43
(58) Field of Search ................................... 710/107–130; 714/40–44, 55–56

(56) References Cited

U.S. PATENT DOCUMENTS

| | | |
|---|---|---|
| 4,503,535 | 3/1985 | Budde et al. . |
| 4,627,054 | 12/1986 | Cooper et al. . |
| 4,785,453 | 11/1988 | Chandran et al. . |
| 4,858,234 | 8/1989 | Hartwell et al. . |
| 4,870,704 * | 9/1989 | Matelan et al. ....................... 710/120 |
| 5,059,552 | 10/1991 | Harder et al. . |
| 5,313,627 | 5/1994 | Amini et al. . |
| 5,499,346 | 3/1996 | Amini et al. . |
| 5,511,164 | 4/1996 | Brumeierk et al. . |
| 5,537,535 | 7/1996 | Maruyama et al. . |
| 5,588,112 | 12/1996 | Dearth et al. . |
| 5,680,537 | 10/1997 | Byers et al. . |
| 5,724,528 | 3/1998 | Kulik et al. . |
| 6,141,769 * | 10/2000 | Petivan et al. ........................ 714/10 |

* cited by examiner

Primary Examiner—Sumati Lefkowitz
(74) Attorney, Agent, or Firm—Robert E. Bushnell, Esq.

(57) ABSTRACT

An error master detector for use in a system having at least two bus masters which request bus use and a bus arbitrator for receiving the bus use requests of the bus masters to arbitrate the bus use. The error master detector includes a bus grant signal synchronizer for latching a bus grant signal generated from the bus arbitrator by a predetermined bus clock; a latch clock generator for latching a latch clock for combining the bus grant signal generated from the bus arbitrator and an output signal synchronized in the bus grant signal synchronizer to latch the bus master information receiving the bus grant signal; a first latch unit for latching an output signal of the bus grant signal synchronizer in synchronous with the latch clock, and clearing the latched value when the bus cycle is normally finished; a second latch unit for latching an output signal of the first latch unit in synchronous with the latch clock; a master information selector for generating the output signal of the first latch unit when the second latch unit has no latched bus master information, and generating the output signal of the second latch unit when the second latch unit has latched master information; and an error master storage unit for storing data selected from the master information selector when a bus cycle error occurs. This way when an error occurs in a bus system in which the arbitration cycle and the data transfer cycle are separately performed, the bus master which causes the error can be easily detected so that the system can be rapidly repaired.

12 Claims, 5 Drawing Sheets

ERROR MASTER DETECTOR

CLAIM FOR PRIORITY

This application makes reference to, incorporates the same herein, and claims all benefits accruing under 35 U.S.C. §119 from an application for ERROR MASTER DETECTOR earlier filed in the Korean Industrial Property Office on the 20$^{th}$ of March 1997, and there duly assigned Ser. No. 9538/1997, a copy of which application is annexed hereto.

BACKGROUND OF THE INVENTION

1. Technical Field

The present invention relates to a system including two or more bus masters and a bus arbitrator for receiving requests for bus use of the bus masters to arbitrate the bus use, and more particularly, relates to an error master detector of a bus master for detecting a corresponding bus cycle error generated by the system.

2. Related Art

Computer systems and data processing systems typically use more than one bus for providing intercommunication between all internal electronic chips and other system devices such as a central processing unit (CPU), memory devices, and direct memory access (DMA) controllers that are connected to the bus. For example, a system bus is provided for system bus devices such as the DMA controller or the input/output (I/O) devices to communicate with the system memory via the memory controller. One type of system bus which has gained wide industry acceptance is the industry standard architecture (ISA) bus. Similarly, a local bus is provided for the CPU to communicate with cache memory or memory controller. An example of a local bus is a peripheral component interconnect (PCI) bus which serves as a parallel data path in addition to an ISA bus.

Typically, each standard bus has many devices attached thereto that serve as bus masters for processing data independently from the bus or other devices. A standard bus arbitrates the use of a bus regardless of a current bus cycle when another bus master requires the bus use during a bus cycle for transferring data. That is, in the standard bus, a data transfer cycle and an arbitration cycle overlap. When the arbitration cycle and the data transfer cycle are separately performed, bus occupying time of the bus master is reduced to increase performance of a system.

Bus errors which occur on a bus where the bus arbitration cycle and the data transfer cycle overlap, are classified into response errors, bus timeout errors and parity errors. Contemporary techniques for detecting bus errors and error recovery are disclosed, for example, U.S. Pat. No. 4,785,453 for *High Level Self-Checking Intelligent I/O Controller* issued to Chandran et al., U.S. Pat. No. 4,855,234 for *Method And Apparatus For Error Recovery In A Multibus Computer System* issued to Hartwell et al., U.S. Pat. No. 5,313,627 for *Parity Error Detection And Recovery* issued to Amini et al., U.S. Pat. No. 5,499,346 for *Bus-To-Bus Bridge For A Multiple Bits Information Handling System That Optimizes Data Transfers Between A System Bus And A Peripheral Bus* issued to Amini et al., U.S. Pat. No. 5,511, 164 for *Method And Apparatus For Determining The Source And Nature Of An Error Within A Computer System* issued to Brunmeier et al., U.S. Pat. No. 5,537,535 for *Multi-CPU System Having Fault Monitoring Facility* issued to Maruyama et al., U.S. Pat. No. 5,588,112 for *DMA Controller For Memory Scrubbing* issued to Dearth et al., and U.S. Pat. No. 5,680,537 for *Method And Apparatus For Isolating An Error Within A Computer System That Transfers Data Via An Interface Device* issued to Byers et al. Generally, when a bus error occurs, the error type is recorded in a predetermined register, i.e., a status register, and the bus error is announced to a processor using an interrupt. In addition, a bus request signal or a bus grant signal of a bus master (error master) where an error occurs are cleared when the bus cycle begins, and the bus request signal or the bus grant signal driven by another bus master is active, i.e., a time difference occurs between the bus grant state and the actual bus. As I have observed, however, only the fact that the error occurred is announced. The bus cycle of a bus master where the error occurred is not announced. Therefore, it is impossible to rapidly repair or recover the bus master causing the bus error.

SUMMARY OF THE INVENTION

Accordingly, it is therefore an object of the present invention to provide an error master detector for detecting a bus master where an error occurs for rapid recovery.

It is also an object to provide an error master detector for storing the bus uses after an error occurs and detecting a bus master where an error occurs in order to rapidly and exactly inform a system controller of bus error generation.

These and other objects of the present invention can be achieved by an error master detector in a system having at least two bus masters which request bus use and a bus arbitrator for receiving the bus use requests of the bus masters to arbitrate the bus use. The error master detector includes a bus grant signal synchronizer for latching bus grant signals generated from the bus arbitrator in accordance with a predetermined bus clock, when the bus grant of the bus master is received from the bus arbitrator; a latch clock generator for generating a latch clock by combining the bus grant signals and synchronous signals provided from the bus grant signal synchronizer to latch bus master information; a first latch unit for latching the synchronous signals from the bus grant signal synchronizer in accordance with the latch clock, and clearing first latched values when the bus cycle is normally finished; a second latch unit for latching first latched values in accordance with the latch clock, and clearing second latched values when the bus cycle is normally finished; a master information selector for selecting the first latched values when the second latch unit has no latched bus master information, and selecting the second latched values when the second latch unit has the latched master information; and an error master storage unit for storing data selected from the master information selector when the bus cycle error occurs The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
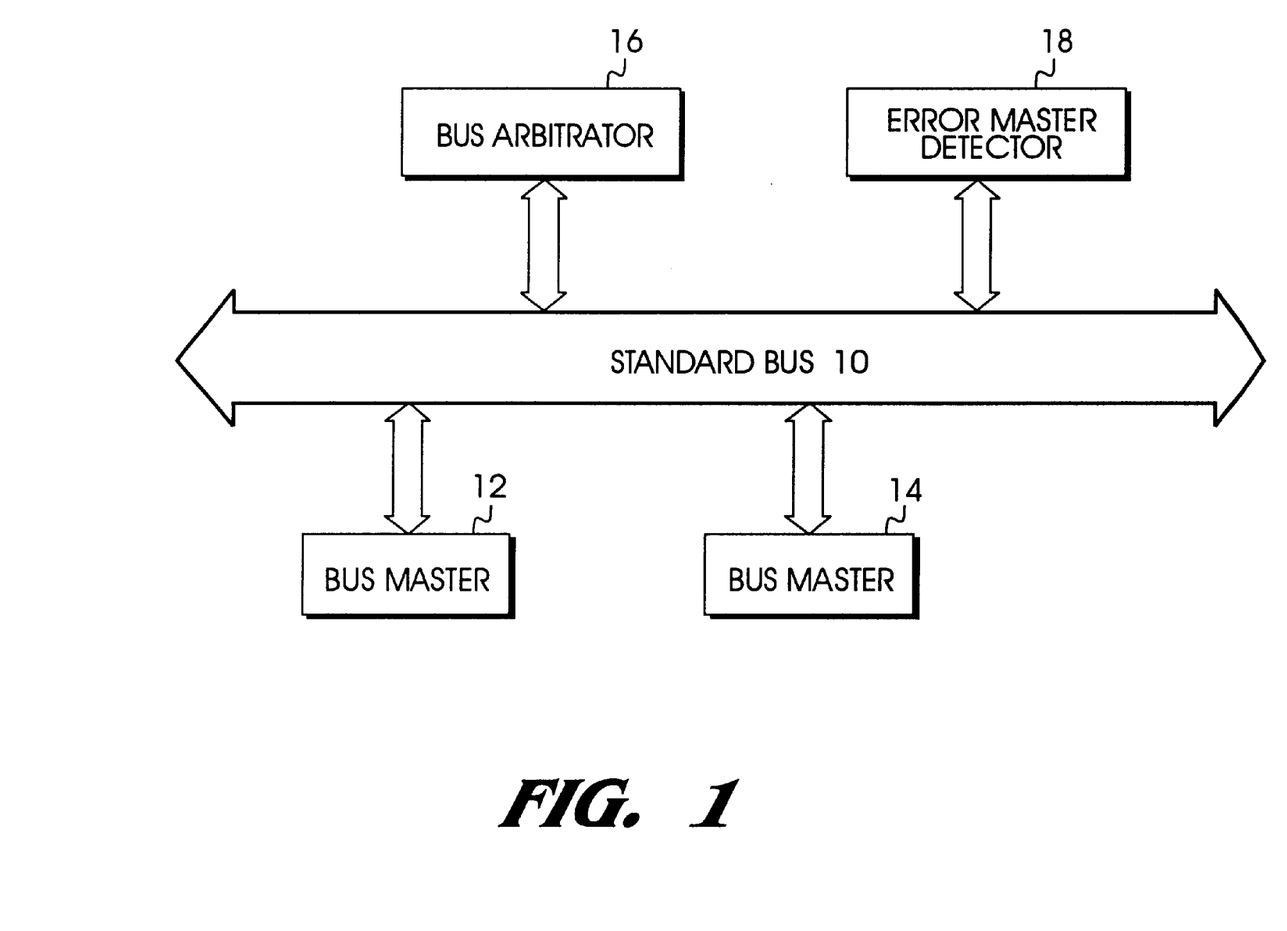
FIG. 1 is a standard bus configuration for use in a data processing system.

Referring now to the drawings and particularly to FIG. 1, which illustrates a standard bus configuration for use in a data processing system having at least two bus masters 12 and 14, a bus arbitrator 16 attached to a standard bus 10 for providing intercommunication between all internal electronic chips and other system devices (not shown) such as a central processing unit (CPU), memory devices, and direct memory access (DMA) controllers that are connected to the bus 10. The error master detector 18 is additionally provided to detect the bus master corresponding to a bus cycle error according to the principles of the present invention in order to rapidly and precisely inform a system controller (not shown) of the data processing system of bus error generation.

Figure 2:
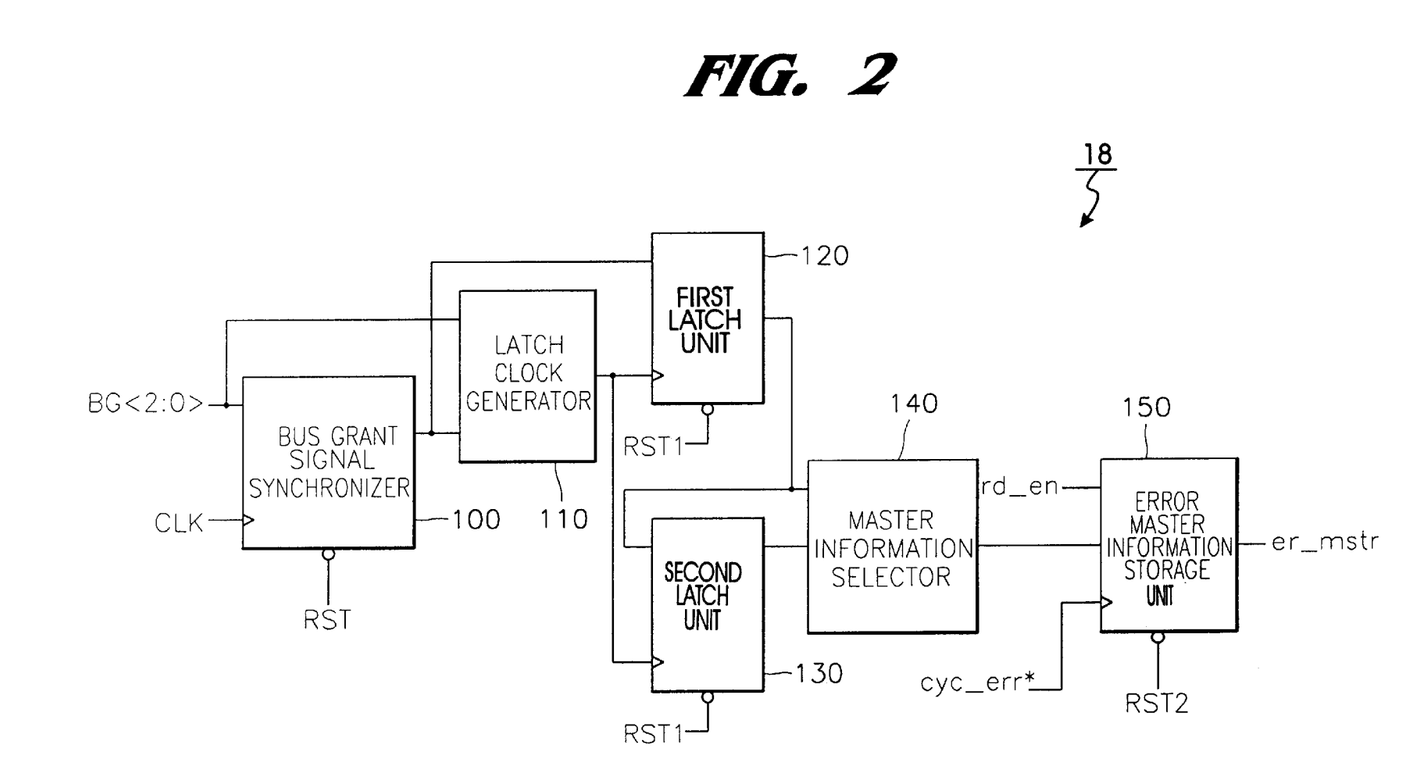
FIG. 2 is a block diagram of an error master detector for detecting a bus master corresponding to a bus cycle error according to the principles of the present invention.

Turning now to FIG. 2 which illustrates, in a block diagram, an error master detector for detecting a bus master corresponding to a bus cycle error according to the principles of the present invention. As shown in FIG. 2, the error master detector includes a bus grant signal synchronizer 100, a latch clock generator 110, a first latch unit 120, a second latch unit 130, a master information selector 140 and an error master information storage unit 150.

Figure 3:
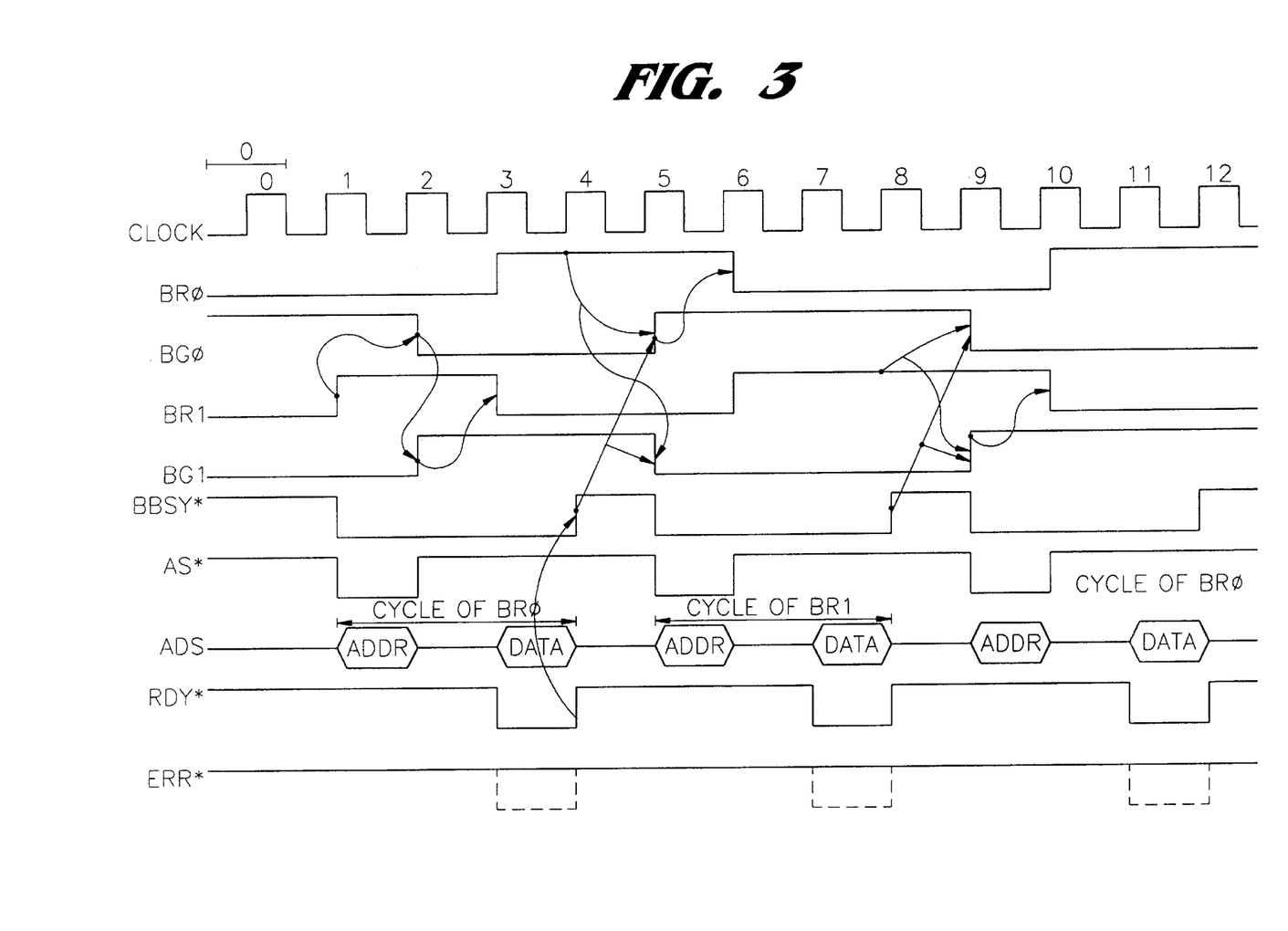
FIG. 3 is a timing diagram of a bus arbitrator.

When a bus cycle error occurs in the data processing system as shown in FIG. 1 including at least two bus masters 12 and 14, and the bus arbitrator 16 for receiving requests for bus use of the bus master 12 or 14 to arbitrate the bus use, the error master detector 18 detects the bus master 12 or 14 corresponding to the bus cycle error in order to inform a system controller (not shown) of the data processing system of bus error generation for correction and recovery. Timing diagrams of the bus arbitrator 16 are shown in FIG. 3 for receiving requests for the bus use of the bus master 12 or 14.

The bus grant signal synchronizer 100 first latches a bus grant signal (BG<2:0>) generated from the bus arbitrator 16 by a predetermined bus clock CLK. The latch clock generator 110 then latches a latch clock for combining the bus grant signal (BG<2:0>) generated from the bus arbitrator 116 and an output signal synchronized in the bus grant signal synchronizer 100 to latch bus master information receiving the bus grant signal. The first latch unit 120 is provided to latch an output signal of the bus grant signal synchronizer 100 in synchronous with the latch clock. The latched value is then cleared from the first latch unit 120 when the bus cycle is normally finished. The second latch unit 130 is provided to latch an output signal of the first latch unit 120 in synchronous with the latch clock. The master information selector 140 generates the output signal of the first latch unit 120 when the second latch unit 130 has no latched bus master information, and generates the output signal of the second latch unit 130 when the second latch unit 130 has latched master information. The error master storage unit 150 is provided to store data generated by the master information selector 140 when a bus cycle error occurs.

Figure 4:
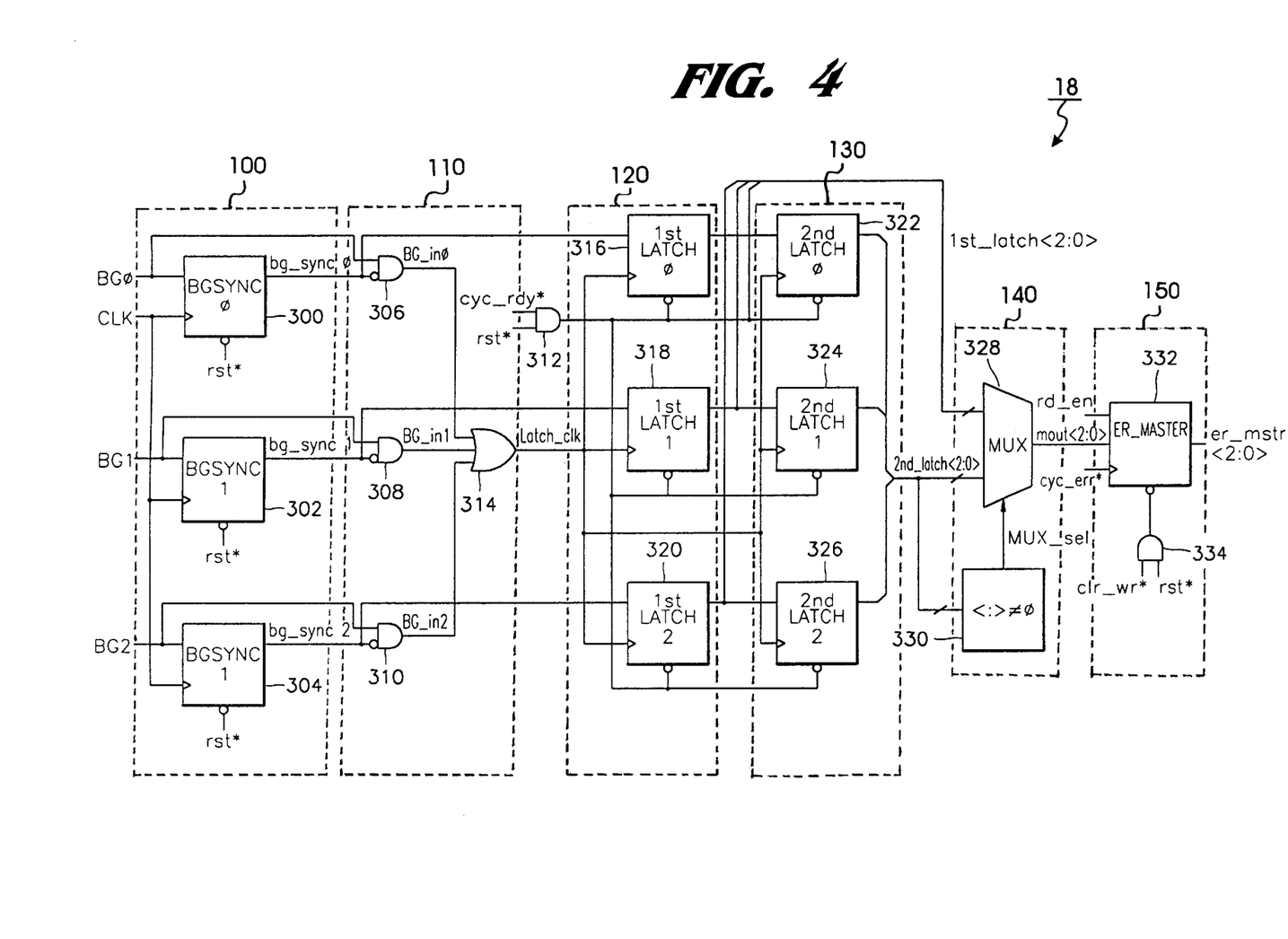
FIG. 4 is a detailed circuit diagram of an error master detector constructed according to the principles of the present invention.
Figure 5A:
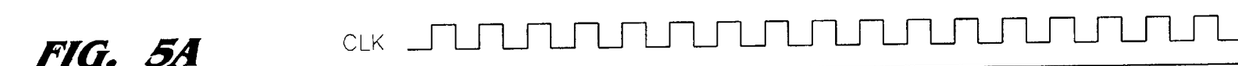
FIGS. 5A–5P are timing diagrams illustrating an operation of the error master detector for detecting a bus master corresponding to a bus cycle error according to the principles of the present invention.
Figure 5B:
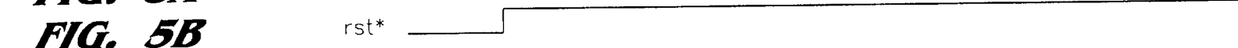
Figure 5C:
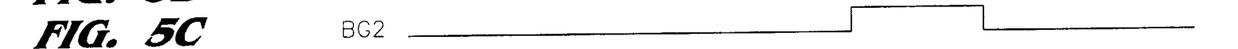
Figures 5D, 5E:
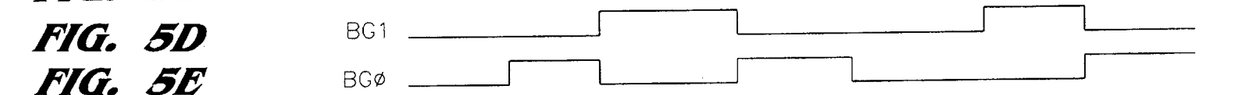
Figures 5F, 5G:
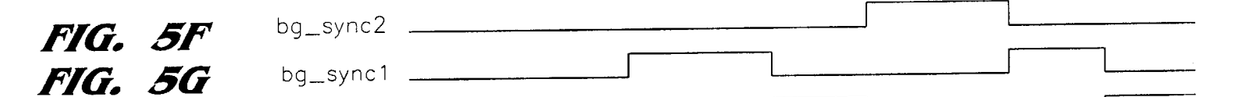
Figure 5H:
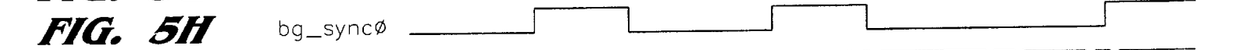

Referring now to FIGS. 4 and 5A–5P which illustrate detailed circuit and timing diagrams of the error master detector 18 constructed according to the principles of the present invention. The bus grant signal synchronizer 100 includes first, second and third synchronizers 300, 302 and 304 each coupled to receive a respective bus grant signal BG$\phi$, BG1, BG2 as shown in FIGS. 5C–5D generated from the bus arbitrator 16 (see FIG. 1) for latching the same to produce a respective sync signal of bg_sync<2:0> consisting of bg_sync$\phi$, bg_sync1 and bp_sync2 as shown in FIGS. 5F–5H in accordance with a bus clock CLK as shown in FIG. 5A. The first, second and third synchronizers 300, 302 and 304 are first reset by a reset signal as shown in FIG. 5B for synchronization operation, when the bus master 12 or 14 receives a bus grant from the bus arbitrator 16.

Figure 5I:
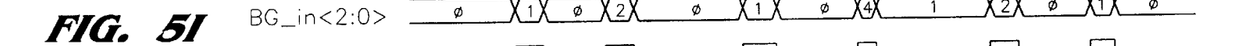

The latch clock generator 110 includes first, second and third AND gates 306, 308, 310 and an OR gate 314. The first, second and third AND gates 306, 308, 310 each has an inverted input terminal coupled to receive a respective sync signal of bg_sync<2:0> consisting of bg_sync$\phi$, bg_sync1 and bp_sync2 from the bus grant signal synchronizer 110 and a non-inverted terminal coupled to receive a respective bus grant signal BG<2:0> consisting of BG$\phi$, BG1, BG2 for logically combining the two input signals to produce a respective logic signal BG_in<2:0> as shown in FIG. 5I. The OR gate 314 logically combines the respective logic signal BG_in<2:0> output from the first, second and third AND gates 306, 308, 310 to generate a latch clock (latch_clk) as shown in FIG. 5J.

Figure 5M:
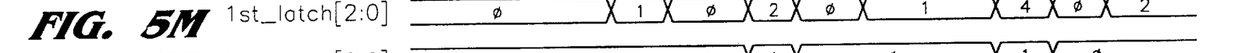

The first latch unit 120 includes first, second and third latches 316, 318, 320 which are coupled to latch the respective sync signal of bg_sync<2:0> consisting of bg_sync$\phi$, bg_sync1 and bp_sync2 from the bus grant signal synchronizer 110 in accordance with the latch clock (latch_clk) generated from the latch clock generator 110 to produce a first latched value (1st_latch<2:0>) as shown in FIG. 5M. When the bus cycle is normally terminated, the latched value of the first latch unit 120 is cleared in response to a combination result of a bus cycle (cyc_rdy*) as shown in FIG. 5K and a reset signal as shown in FIG. 5B.

The second latch unit 130 includes first, second and third latches 322, 324, 326 which are respectively coupled to latch the first latched value (1st_latch<2:0>) from the first latch unit 120 in accordance with the latch clock (latch_clk) generated from the latch clock generator 110 to produce a second latched value (2nd_latch<2:0>) as shown in FIG. 5N. When the bus cycle is normally terminated or when the reset signal rst* is active where '*' indicates an active low signal, the latched value of the second latch unit 130 is cleared in response to the combination result of a bus cycle (cyc_rdy*) as shown in FIG. 5K and a reset signal as shown in FIG. 5B.

Figure 5P:
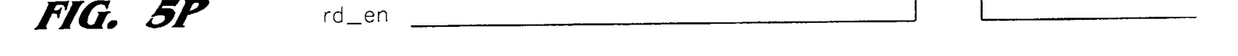

The master information selector 140 includes a multiplexer MUX 328 and a selector 330. The multiplexer MUX 328 generates a multiplexed output (mout<2:0>) in accordance with a selection signal MUX_sel. The multiplexed output (mout<2:0>) indicates either the output signal of the first latch unit 120 when the second latch unit 130 has no latched bus master information, or the output signal of the second latch unit 130 when the second latch unit 130 has latched master information The error master information storage unit 150 includes a master unit 332 and an AND gate 334. The master unit 332 receives the multiplexed output (mout<2:0>) from the master information selector 140 along with an error response signal cyc_err* as shown in FIG. 5L and a read address signal rd_en as shown in FIG. 5P to generate an error master signal (er_mstr<2:0>) as shown in FIG. 5P. The master unit 332 is controlled by an output of the AND gate 334 to store data generated by the master information selector 140 when the bus cycle error occurs, and generate the error master signal (er_mstr<2:0>) for a system processor to detect the error master.

Now, the operation of the error master detector of the present invention will now be described in detail with reference to FIGS. 2 to 5A–5P hereinbelow.

First, when a bus request signal is generated by the bus master 12 or 14, only one bus grant signal is generated by the bus arbitrator 16. That is, when the bus grant signal BG<2:0> is generated, the bus grant signal BG<2:0> is received by the bus grant signal synchronizers 300, 302 and 304, and the bus grant signal synchronizers 300, 302 and 304 generate a signal of bg_sync<2:0> by a latch clock CLK. The signal of bg_sync<2:0> is received by the latch clock generators 306, 308 and 310. The latch clock generator 306, 308 and 310 logic-combines the signals of BG_snce<2:0> and BG<2:0>, to generate a signal of BG_in<2:0>. The signals of bg_in<2:0> are OR-operated by an OR gate 314 to be generated as a signal of Latch_clk. The signal of Latch_clk is used for a latch clock of the first latch unit 316, 318 and 320 and the second latch unit 322, 324 and 326 for storing the bus grant signal.

The signal of latch_clk is a clock signal for storing the bg_sync<2:0> received by the first latch unit 316, 318 and 320 and generated by the bus grant signal synchronizer 300, 302 and 304. That is, the signal of latch_clk is generated as a clock signal for storing the bus grant signal, whenever a bus grant status is changed. The output signal 1st_latch<2:0> of the first latch unit 316, 318 and 320 is received by the second latch unit 322, 324 and 326, and stored in the second latch unit 322, 324 and 326 by the latch_clk. The data stored in the first latch unit 316, 318 and 320 and second latch unit 322, 324 and 326 are different except in the cleared state. The second latch unit 322, 324 and 326 stores the 1st_latch<2:0> value since the second latch_clk is generated. However, the stored value is cleared when the bus cycle normally ends or the reset signal rst* is enabled, and a new value is stored when a new bus grant signal is generated.

The output signal 1st_latch<2:0> of the first latch unit 316,318 and 320 and the output signal 2nd_latch<2:0> of the second latch unit 322, 324 and 326 are input to the master information selectors 328 and 330, and only one of the two signals of the master information selector 328 is output by a MUX_sel signal. According to the present invention, when the 2nd_latch<2:0> is zero, the 1st_latch<2:0> is output, and when not zero, the MUX_sel value is determined such that the 2nd_latch<2:0> is output.

When the 2nd_latch<2:0> is zero, the bus grant signal is only generated once after the first latch unit 316, 318 and 320 and second latch unit 322, 324 and 326 are cleared. Accordingly, if a bus error occurs, another bus master cannot receive bus requests and bus grants, to thereby detect a bus master generating errors from the 1st_latch<2:0>. If the 2nd_latch <2:0> is not zero, only another bus grant signal exists on the bus, due to a second bus grant. Accordingly, in the case that a bus error occurs, the bus master of a negated bus grant signal is the bus master causing the bus error.

Therefore, when an output signal mout<2:0> of the master information selector 328 is received by the error master information storage unit 150, and thus an error signal cyc_err* occurs, the error signal is stored in the error master information storage unit 150. When the bus error occurs, it is announced to a system processor (not shown) by an interrupt. Then, when the system processor reads a predetermined address, a signal rd_en is generated, and when er_mstr<2:0> is output from the error master information storage unit 150, the system processor detects the error master. In addition, the error master information storage unit 150 stores only the first error master information, so that it does not detect other error masters even if errors occur in series. The system processor checks the error master, and then clears the error master information storage unit 150, and thus activates a signal clr_wr* by a writing operation in a predetermined address to detect an error master.

Referring to FIG. 5B, the signal rst* changes from low to high in a predetermined time to finish the resetting operation. Then, a system normally operates, and a clock CLK begins to be generated by a clock generator (not shown). When the bus masters 12 and 14 (see FIG. 1) request the bus, and then the bus use is granted to the bus master 0 by the bus arbitrator 16 and thus the bus grant signal BG0 is active, a latch_clk as shown in FIG. 5A is generated through the bus grant signal synchronizer and the latch clock generator. Subsequently, the latch_clk as shown in FIG. 5J is used as a latch clock of the first latch unit 316, 318 and 320 and the second latch unit 322, 324 and 326, to thereby store the bg sync<2:0> in the first latch unit 316, 318 and 320. The bus master 0 performs an address cycle and a data cycle. However, when a bus master 1 requests the bus, the BG0 is cleared in a clock 3 of FIG. 4 and the BG1 is active. Thus, the first bus master 12 pauses data transfer until the second bus master 14 finishes a data transfer cycle. At this time, the bus cycle is finished when a bus cycle normal finishing signal cyc_rdy* as a response signal is generated by a slave. Accordingly, before the bus cycle for data transfer is finished, the bus grant is given to the first bus master 12. When the bus cycle normal finishing signal cyc_rdy* is generated, a cycle of the first bus master 12 begins from a clock 8, and when the second bus master 14 requests the bus again, the bus grant signal BG1 is active in the clock 8. Then, the cycle of the first bus master 12 is finished in the clock 8. If another bus master (bus master 3—not shown) requests the bus in the clock 11, the bus grant signal is transferred to the bus master 3 in the clock 12. When the slave drives the error response signal cyc_err*, the bus master 3 has the bus use grant, however, the error master which generated the bus error is bus master 0. In order to detect the bus master 0, the output signals of the first and second latches are generated as '1' (001) and the generated signals '1' are stored in the error master information storage. When a bus error occurs, it is announced to the processor through an interrupt. The system processor senses that errors occurred in a cycle of the bus master 0 by reading a value '1' from the error master information storage. Also, the system processor analyzes the cause of the error. Subsequent cycles will be checked in the above manner with reference to FIGS. 5A–5P.

When four or more bus masters exist in such a data processing system, where three bus masters existed according to the above description, only logic corresponding to BG<x:3> is expanded. Therefore, the invention is not limited to the above example.

As described above, the bus grant signal according to the bus use requirement is stored until an error occurs, and the error master is recorded and announced to a system processor. According to the principles of the present invention, when an error occurs in a bus system in which the arbitration cycle and the data transfer cycle are separately performed, the master which causes the error can be easily detected, to thereby rapidly repair the system. In addition, while it is difficult to detect an error in a complicated system having various controllers and bus masters mounted on one control board, the error master detector of the present invention can easily detect an error master so that defects can be rapidly repaired.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An error master detector for detecting a bus master corresponding to a bus cycle error occurring in a data processing system having at least two bus masters which request bus use and a bus arbitrator for receiving the bus use requests of the bus masters to arbitrate the bus use, said error master detector comprising:
    a bus grant signal synchronizer for latching bus grant signals generated from the bus arbitrator in accordance with a predetermined bus clock, when the bus grant of the bus master is received from the bus arbitrator;
    a latch clock generator for generating a latch clock by combining the bus grant signals and synchronous signals provided from the bus grant signal synchronizer to latch bus master information;
    a first latch unit for latching the synchronous signals from the bus grant signal synchronizer in accordance with the latch clock, and clearing first latched values when the bus cycle is normally finished;
    a second latch unit for latching first latched values in accordance with the latch clock, and clearing second latched values when the bus cycle is normally finished;
    a master information selector for selecting the first latched values when the second latch unit has no latched bus master information, and selecting the second latched values when the second latch unit has the latched master information; and
    an error master storage unit for storing data selected from the master information selector when the bus cycle error occurs.

2. The error master detector of claim 1, further comprised of said bus grant signal synchronizer comprising first, second and third synchronizers each coupled to receive a respective bus grant signal generated from the bus arbitrator for latching to produce a respective synchronous signal in accordance with said predetermined bus clock, said first, second and third synchronizers being reset by a reset signal for latching operation, when the bus master receives said bus grant from the bus arbitrator.

3. The error master detector of claim 2, further comprised of said latch clock generator comprising:
    a plurality of AND gates each having an inverted input terminal coupled to receive a respective synchronous signal from the bus grant signal synchronizer and a non-inverted terminal coupled to receive a respective bus grant signal for logically combination to produce a respective logic signal; and
    an OR gate for logically combining the respective logic signal output from said plurality of AND gates to generate said latch clock.

4. The error master detector of claim 3, further comprised of said first latch unit comprising a first plurality of individual latches respectively coupled to latch the respective synchronous signal from the bus grant signal synchronizer in accordance with the latch clock to produce said first latched values, said first plurality of individual latches being simultaneously reset when the bus cycle is normally terminated.

5. The error master detector of claim 4, further comprised of said second latch unit comprising a second plurality of individual latches respectively coupled to latch the first latched values in accordance with the latch clock to produce said second latched values, said second plurality of individual latches being simultaneously reset when the bus cycle is normally terminated.

6. The error master detector of claim 1, further comprised of said master information selector comprising a multiplexer for generating a multiplexed output in accordance with a selection signal, said multiplexed output indicating the first latch values when the second latch unit has no latched bus master information, and the second latch values when the second latch unit has latched master information.

7. A data processing system,
    a bus,
    at least two bus masters;
    a bus arbitrator for receiving bus grant requests from one of the bus masters to arbitrate the bus use;
    an error master detector for detecting a bus master corresponding to a bus cycle error which occurs in said data processing system, said error master detector comprising:
        a bus grant signal synchronizer for synchronizing bus grant signals generated from the bus arbitrator in accordance with a bus clock, when a bus grant request of the bus master is received from the bus arbitrator;
        a latch clock generator for generating a latch clock in response to the bus grant signals and synchronous signals provided from the bus grant signal synchronizer;
        a first latch unit for latching the synchronous signals from the bus grant signal synchronizer in accordance with the latch clock to produce first latched values, and clearing said first latched values when the bus cycle is completed;
        a second latch unit for latching said first latched values in accordance with the latch clock to produce second latched values, and clearing said second latched values when the bus cycle is completed;
        a master information selector for selecting one of said first latched values and said second latched values in dependence upon whether said second latch unit has latched bus master information; and
        an error master storage unit for storing data indicating the bus master from the master information selector when the bus cycle error occurs.

8. The error master detector of claim 7, further comprised of said bus grant signal synchronizer comprising first, second and third synchronizers each coupled to receive a respective bus grant signal generated from the bus arbitrator for latching to produce a respective synchronous signal in accordance with said bus clock, said first, second and third synchronizers being reset by a reset signal for latching operation, when the bus master receives said bus grant from the bus arbitrator.

9. The error master detector of claim 8, further comprised of said latch clock generator comprising:
   a plurality of AND gates each having an inverted input terminal coupled to receive a respective synchronous signal from the bus grant signal synchronizer and a non-inverted terminal coupled to receive a respective bus grant signal for logically combination to produce a respective logic signal; and
   an OR gate for logically combining the respective logic signal output from said plurality of AND gates to generate said latch clock.

10. The error master detector of claim 9, further comprised of said first latch unit comprising a first plurality of individual latches respectively coupled to latch the respective synchronous signal from the bus grant signal synchronizer in accordance with the latch clock to produce said first latched values, said first plurality of individual latches being simultaneously reset when the bus cycle is normally terminated.

11. The error master detector of claim 10, further comprised of said second latch unit comprising a second plurality of individual latches respectively coupled to latch the first latched values in accordance with the latch clock to produce said second latched values, said second plurality of individual latches being simultaneously reset when the bus cycle is normally terminated.

12. The error master detector of claim 11, further comprised of said master information selector comprising a multiplexer for generating a multiplexed output in accordance with a selection signal, said multiplexed output indicating the first latch values when the second latch unit has no latched bus master information, and the second latch values when the second latch unit has latched master information.

* * * * *